C. Y. HOOD & J. CHALMERS.
AUTOMATIC CHOKE VALVE.
APPLICATION FILED AUG. 5, 1910. RENEWED SEPT. 15, 1911.
1,017,415.  Patented Feb. 13, 1912.
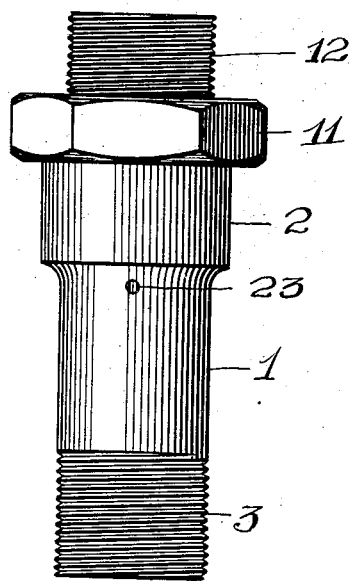
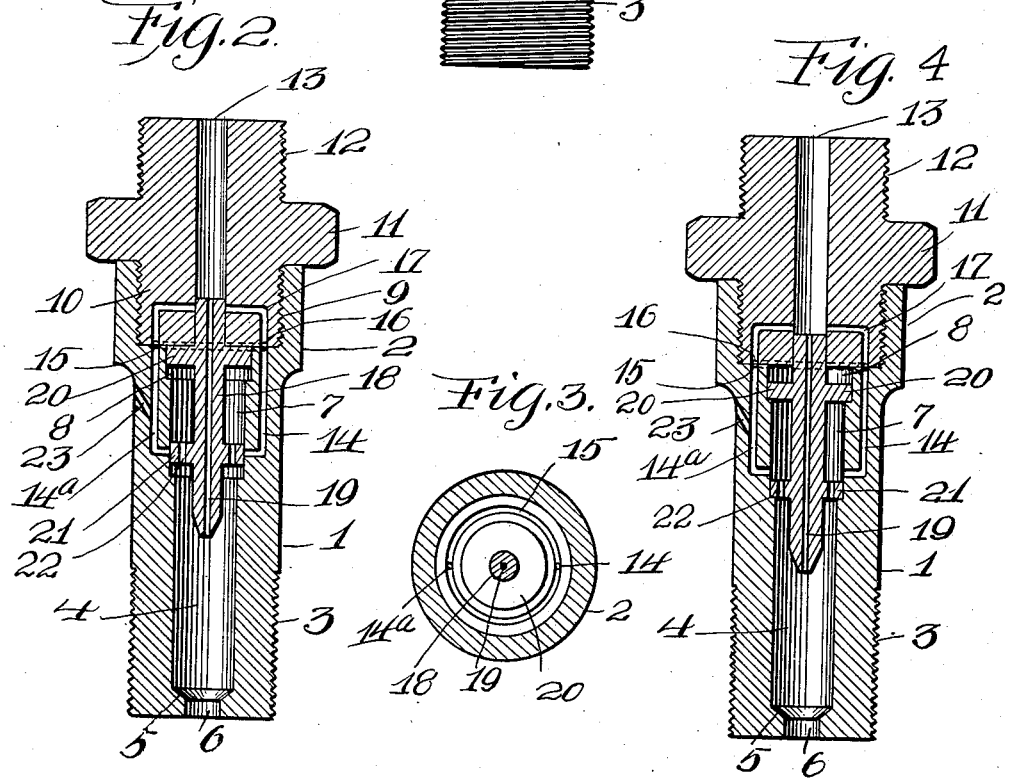

UNITED STATES PATENT OFFICE.

CHARLES Y. HOOD, OF WILKINSBURG, AND JAMES CHALMERS, OF HOMEWOOD, PENNSYLVANIA.

AUTOMATIC CHOKE-VALVE.

1,017,415.  Specification of Letters Patent.  Patented Feb. 13, 1912.

Application filed August 5, 1910, Serial No. 575,678. Renewed September 15, 1911. Serial No. 649,533.

*To all whom it may concern:*

Be it known that we, (1) CHARLES Y. HOOD and (2) JAMES CHALMERS, citizens of the United States of America, residing at (1) Wilkinsburg and (2) Homewood, in the county of Allegheny and State of Pennsylvania, have invented certain new and useful Improvements in Automatic Choke-Valves, of which the following is a specification, reference being had therein to the accompanying drawing.

This invention relates to an automatic choke valve particularly designed for steam chests and cylinders of locomotives, but applicable to various types of stationary and portable engines wherein lubricators are employed and adapted to supply a lubricant to the steam lines of a locomotive for lubricating movable steam actuated elements.

The primary object of our invention is to provide a valve of the above type that can be easily interposed between a lubricator and a steam line for controlling the amount of lubricant fed to the steam line, at the same time insuring thorough lubrication of the movable parts, thereby reducing the wear and tear to a minimum and increasing the efficiency of the engine.

Another object of this invention is to provide an automatic valve that will be actuated by a reduction or increase in the pressure of steam to control the flow of lubricant and to retain the same in a workable and fluid state.

A further object of our invention is to provide a valve of the above type that is simple in construction, durable, inexpensive to manufacture and highly efficient, particularly in connection with locomotives.

These and such other objects as may hereinafter appear are attained by the novel construction, combination and arrangement of parts to be hereinafter referred to in detail, and reference will now be had to the drawing, wherein there is illustrated a preferred embodiment of the invention, but it is to be understood that the structural elements thereof can be varied or changed, as to the size, shape and manner of assemblage without departing from the spirit and scope of the invention as defined by the appended claims.

In the drawings: Figure 1 is an elevation of a valve constructed in accordance with our invention. Fig. 2 is a vertical sectional view of the same with the by-paths thereof closed. Fig. 3 is a horizontal sectional view of the valve, and Fig. 4 is a vertical sectional view showing the by-paths open.

A valve constructed in accordance with our invention comprises a cylindrical body 1 having the upper end thereof enlarged, as at 2, and the lower end exteriorly screw threaded, as at 3, whereby the valvular body can be mounted in a steam chest, steam line or structure to which a lubricant is to be fed. The body 1 is provided with a longitudinal bore 4 having the lower end thereof reduced, as at 5, and terminating in an opening 6. The upper end of the bore 4 is enlarged and stepped to form an intermediate chamber 7 and an end chamber 8, said end chamber terminating in a socket 9 having the walls thereof threaded to receive an exteriorly threaded plug 10 formed integral with a nut 11 having the opposite side thereof provided with an exteriorly threaded nipple 12. Upon the nipple 12 can be threaded or otherwise mounted a lubricant receptacle (not shown) and the lubricant from said receptacle is adapted to pass through a longitudinal port 13 to the end chamber 8. The valvular body has the opposite sides thereof provided with by-paths 14 and 14ª in communication with the chamber 7, said by-paths extending upwardly in the body 1 and communicating with an annular groove 15 formed in the bottom of the socket 9 and surrounding the upper edges of the end chamber 8.

The lower end of the plug 10 is provided with an annular groove 16 adapted to register with the groove 15 of the body 1 and provide an annular port, and communicating with said port are oppositely disposed by-paths 17 establishing communication between the by-paths 14 and 14ª and the port 13.

Slidably mounted in the chambers 7 and 8 is a tubular stem 18 having the bore 19 thereof extending the entire length of said stem and establishing communication between the bore 4 and the port 13. The stem 18 intermediate the ends thereof is provided with annular heads or collars 20 and 21, the head 20 being of a diameter corresponding to the chamber 8 and the head 21 corresponding to the diameter of the chamber 7, said head being provided with oppositely disposed vertical ports 22. The valve body 1 is provided with an angularly disposed port 23 communicating with the by-path 14ª.

The pressure of steam within the bore 4 is adapted to hold the stem 18 in an elevated position, whereby the head 21 will close the lower ends of the by-paths 14 and 14ª, while the upper end of said stem closes the upper ends of the by-paths 17. With the stem 18 in a lowered position, the by-paths 14, 14ª, and 17 are adapted to establish communication between the chamber 7 and the port 13.

The valve is particularly designed for locomotives and is used between the lubricator and the steam chest, and the pressure of steam upon both sides of the valve are equal under certain conditions. When the locomotive is running, the valve is in the position shown in Fig. 2 of the drawings with the ports 14 and 17 closed, consequently the port 23 is closed. The steam pressure above the valve forces the lubricant through the port 19 into the steam chest or cylinder, and as the port 19 is of less diameter than the port 13, the pressure of steam above the valve is increased. The pressure in the port 13 is increased owing to the fact that the port 19 acts as a nozzle. In other words, the port 19 is a reduction in the size of the port 13 and since the steam will be retarded to a certain extent, it will be projected through the port 19 with considerable force on account of the back pressure in the port 13. This type of nozzle and the same principle as involved in this choke valve can be found in steam injectors. The pressure within the port 13 is the boiler pressure from the lubricator and the lubricant is carried from the choke valve into the cylinders of the engine. The valve gets its name "choke" for the reason that the upper end of the valve chokes the port 13 and reduces the size of it, thereby causing a compression in the port 13 which raises the pressure of steam and forces the lubricant through the port 19. This prevents a vacuum in the cylinder or steam chest of a locomotive. When an engine is drifting, that is going down grade, the steam is shut off. The valve then drops to the position shown in Fig. 4 of the drawing, opening the ports 17 and 14 and thereby increasing the passage between the ports 13 and 4. The lubricant can pass through the ports 17 and 14 and the ports 19 and 21. It is very essential that when the engine is drifting the lubricant be fed to the steam chest and cylinder, to prevent the pistons and valve from becoming heated and when in such condition breaks. It is the idle movement of the pistons and valves that creates a vacuum in the cylinder and if it was not for the greater pressure of lubricant in the port 13, the fumes and gases from the cylinder would counteract the pressure of lubricant and prevent the lubricant from flowing into the cylinder. The valve really gets its name owing to the fact that the lubricant line is choked. The function of the valve is to make proper provision for the lubricating of a steam cylinder when the engine is drifting, that is, going down grade with the steam shut off in the cylinders. As the pistons move back and forth, the piston racks are heated sometimes to a cherry red, and considerable trouble is experienced owing to the fact that the pistons create a partial vacuum in the cylinders and draw grit and dirt into the cylinders from the smoke box, causing the packing rings to be cut out and injured to that extent as to need renewing, necessitating the placing of the engine in the repair shop. Now to prevent this partial vacuum, particularly the suction of foreign matter from the smoke box, the choke valve is opened sufficiently to allow the pistons to suck steam into the cylinder, the supply of steam being regulated by the lubricator (not shown). It is obvious that when the steam is sucked through the ports 13 and 4 that lubricant is carried with the steam. When an engine is in storage or standing at a station, with the steam shut off, the steam in the cylinder can escape through the ports 21 into the port 14ª and to the atmosphere through the port 23. This port 23 serves to drain the cylinder or steam chest when the locomotive is placed in storage, and as the lubricant is shut off when an engine is placed in storage, it cannot drain into the cylinder and waste.

What we claim, is:

1. An automatic choke valve comprising a body having a longitudinal bore formed therein, a chamber and a socket, a plug detachably mounted in the socket of said body and having a longitudinal port formed therein, said plug and said body having oppositely disposed by-paths formed therein establishing communication between said chamber and the port of said plug, a stem slidably mounted in the chamber of said body and extending into the port of said plug, said stem having a longitudinal port formed therein, and a head carried by said stem and adapted to close the lower ends of said by-paths, said head having ports formed therein, substantially as and for the purpose herein described.

2. An automatic choke valve comprising a body having a longitudinal bore formed therein, a chamber and a socket, a plug detachably mounted in the socket of said body and having a longitudinal port formed therein, said plug and said body having oppositely disposed by-paths formed therein establishing communication between said chamber and the port of said plug, a stem slidably mounted in the chamber of said body and extending into the port of said plug, said stem having a longitudinal port formed therein, a head carried by said stem and adapted to close the lower ends of said by-paths, said head having ports formed therein, and means adapted to normally establish communication between the by-paths of said plug and the by-paths of said body.

3. A choke valve comprising a body, said body having a longitudinal bore formed therein with the upper end of said bore enlarged to provide an intermediate chamber and a socket, said body having by-paths formed therein in communication with said chamber, a plug detachably mounted in the socket of said body and having a longitudinal port in communication with the chamber of said body, said plug having by-paths formed therein normally in communication with the by-paths of said body, said body having a port formed therein communicating with one of the by-paths of said body, a stem slidably mounted in the chamber of said body and extending into the port of said plug, said stem having a longitudinal port formed therein, and a head carried by said stem and adapted to close the by-paths of said body, said head having ports formed therein, substantially as described.

4. A choke valve comprising a body, said body having a longitudinal bore formed therein with the upper end of said bore enlarged to provide an intermediate chamber and a socket, said body having by-paths formed therein in communication with said chamber, a plug detachably mounted in the socket of said body and having a longitudinal port in communication with the chamber of said body, said plug having by-paths formed therein normally in communication with the by-paths of said body, said body having a port formed therein communicating with one of the by-paths of said body, a stem slidably mounted in the chamber of said body and extending into the port of said plug, said stem having a longitudinal port formed therein, a head carried by said stem and adapted to close the by-paths of said body, and adapted to limit the movement of the stem in one direction, said head having ports formed therein, and means carried by said stem and adapted to limit the movement of said stem in opposite directions, substantially as described.

In testimony whereof we affix our signatures in the presence of two witnesses.

CHARLES Y. HOOD.
JAMES CHALMERS.

Witnesses:
K. H. BUTLER,
EDWIN FREY.

Copies of this patent may be obtained for five cents each, by addressing the "Commissioner of Patents, Washington, D. C."